UNITED STATES PATENT OFFICE.

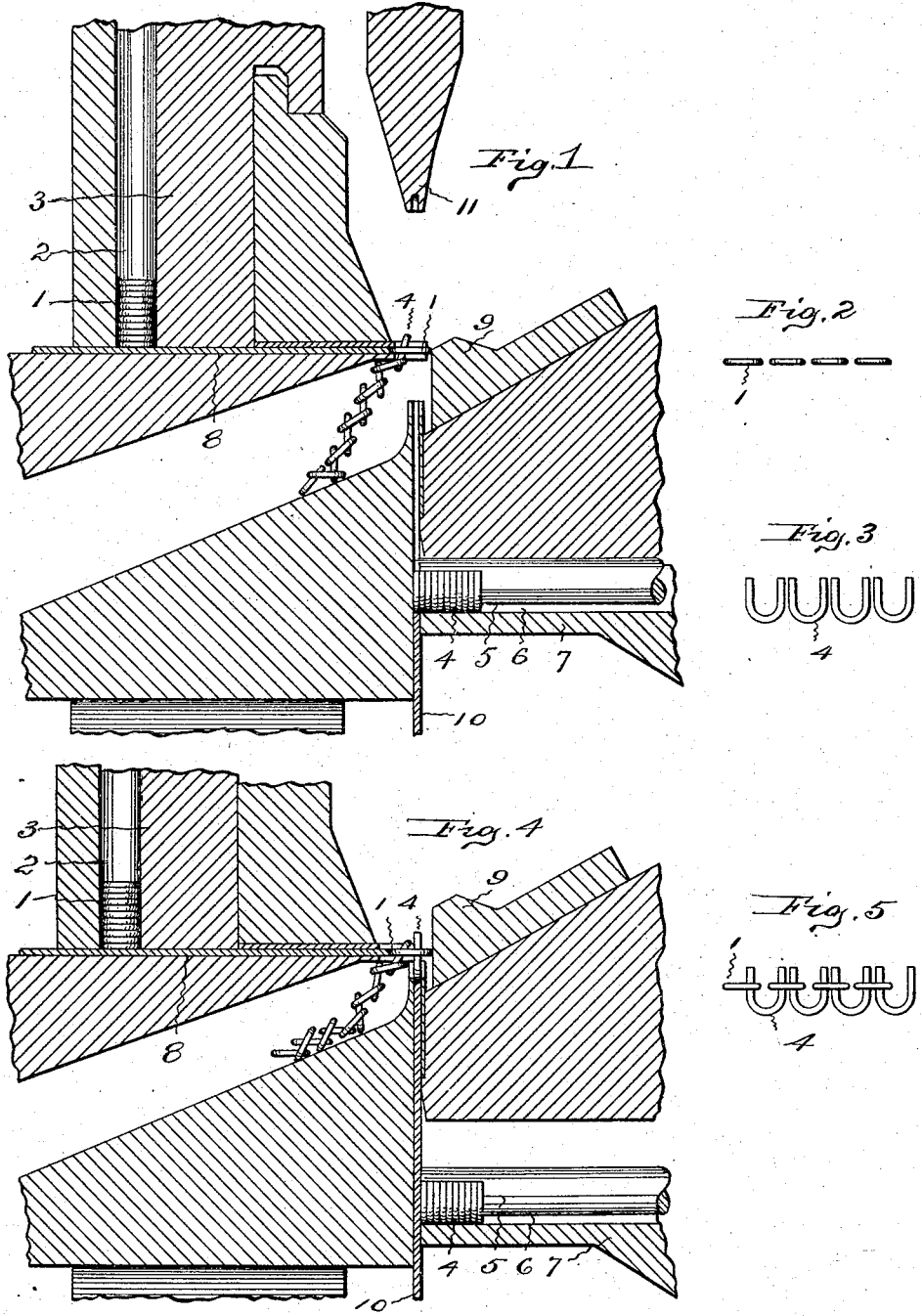

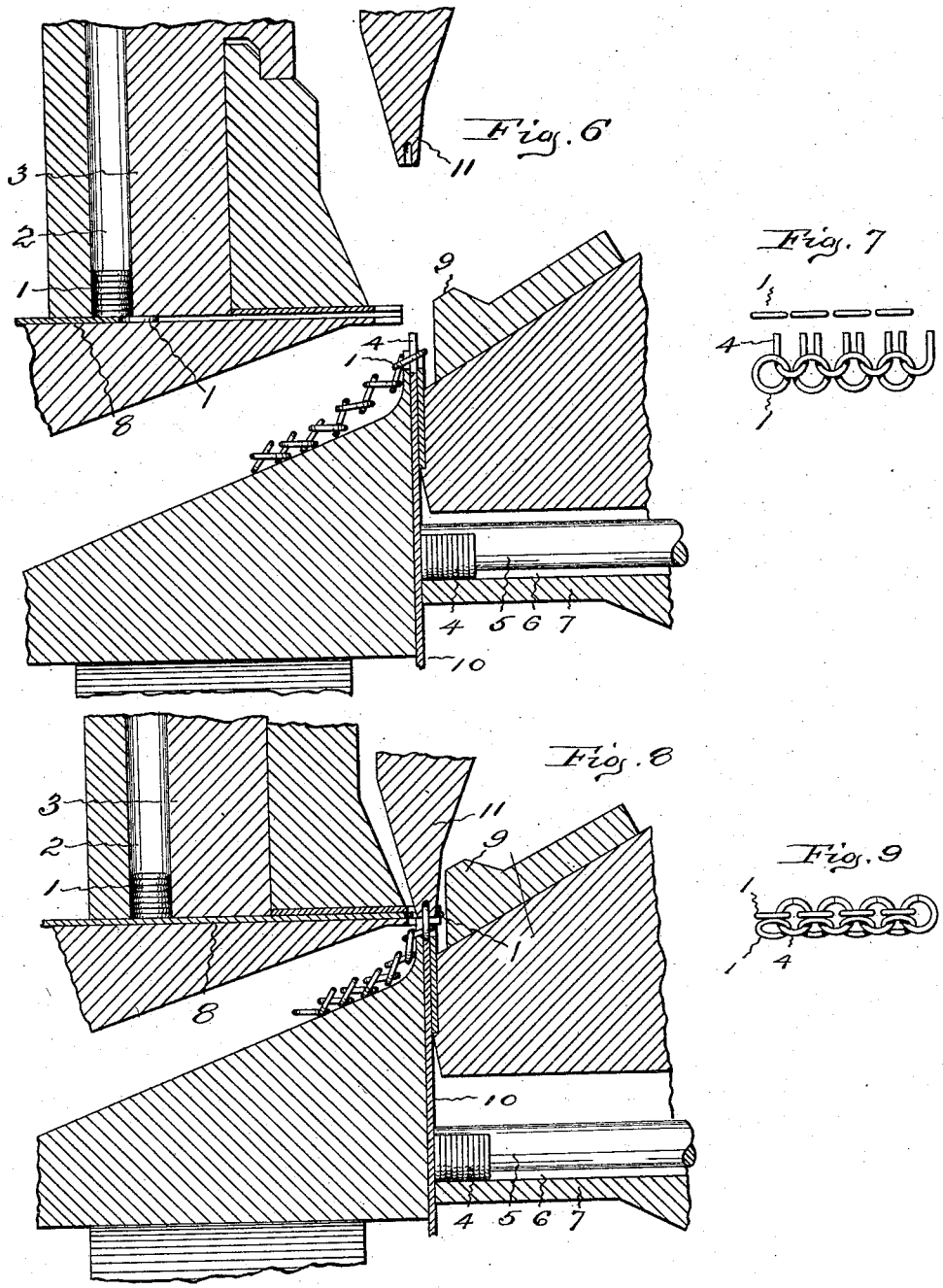

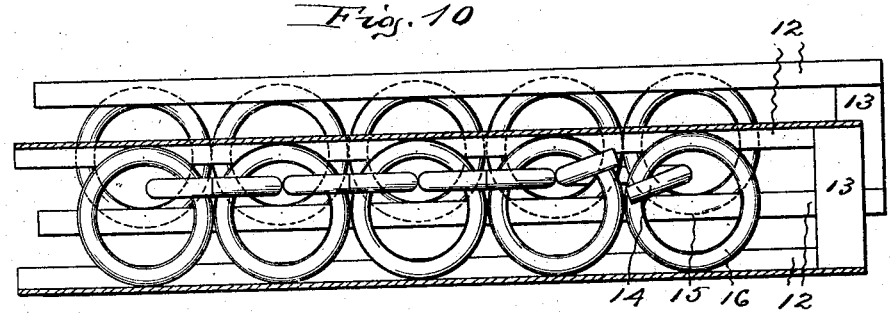
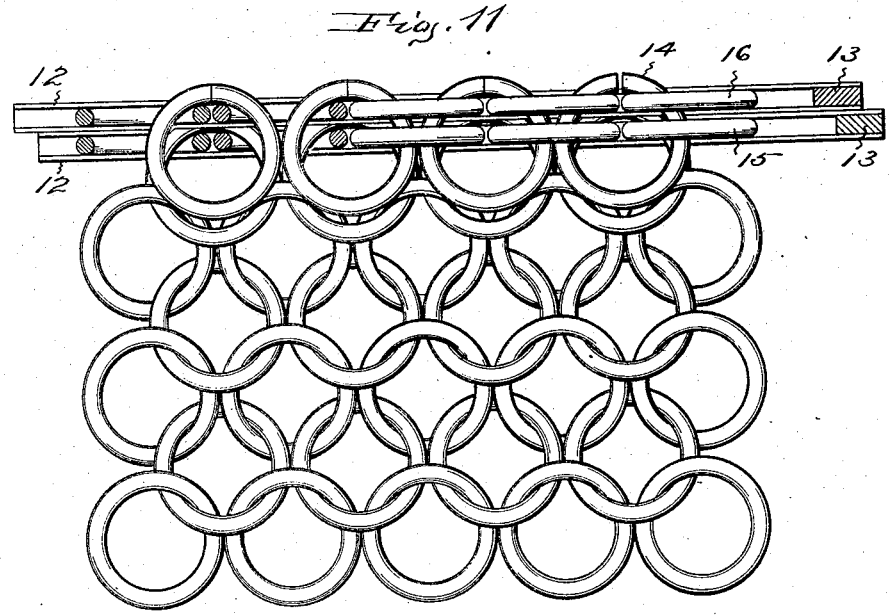
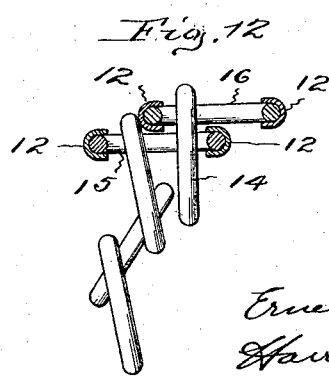

ERNEST WALKER SMITH, OF HARTFORD, CONNECTICUT.

PROCESS OF MANUFACTURING WIRE-LINK MESH.

1,186,854.  Specification of Letters Patent.  Patented June 13, 1916.

Application filed October 27, 1913, Serial No. 797,564. Renewed March 8, 1916. Serial No. 82,917.

*To all whom it may concern:*

Be it known that I, ERNEST WALKER SMITH, a citizen of the United States, residing at Hartford, in the county of Hartford and State of Connecticut, have invented a new and useful Improvement in Processes of Manufacturing Wire-Link Mesh, of which the following is a specification.

This invention relates to a method of manufacturing link-mesh, that is, manufacturing a fabric which is formed of interlocked wire rings or links.

The object of the invention is to provide a simple method, whereby mesh of rings or links of any size, shape and material can be easily and rapidly manufactured by hand-manipulated apparatus, or by automatic machinery.

The method which forms the subject of this invention may be employed for manufacturing mesh of closed round rings or links of any other desired shape, and opened links or staples which are formed into closed rings or links after they have been passed through the originally closed links for locking them together.

Figure 1 of the accompanying drawings shows a sectional view of parts of a machine designed to manipulate rings and staples and form a mesh fabric according to this method. In this view the parts are in the positions occupied when a row of rings has been fed over a row of staples and the staples are about to be fed up through the rings. Figs. 2 and 3 illustrate the relations of the rows of rings and staples when the parts are in the positions seen in Fig. 1. Fig. 4 is a section similar to that shown in Fig. 1, with the parts in the positions occupied when the row of staples has been fed up through the row of rings. Fig. 5 shows the relative positions of the rings and staples when the parts are in the positions illustrated in Fig. 4. Fig. 6 is a similar section of the machine parts with the staples and the rings through which the staples are passed, lowered and another row of rings about to be advanced over the staples. Fig. 7 illustrates the relations of the rings and staples in Fig. 6. Fig. 8 is a similar section of the machine parts in the positions occupied after the following row of rings has been advanced and the staples already through one row of rings are raised so that their free ends are through the following row of rings, and a punch has descended for closing the free ends of the staples so as to lock the two rows of rings together. Fig. 9 shows a view of the rings and closed staples in the relations shown in Fig. 8. Fig. 10 shows a simple form of apparatus which may be manipulated by mechanism or by hand for putting together rows of rings according to this method. In this view the originally closed rings and originally opened locking rings are round, and one of the locking rings is shown with its ends separated in order to illustrate its condition when it is engaged with the closed rings for locking them together. Fig. 11 illustrates the mesh formed by this process. In this figure the ring holding formers shown in Fig. 10, and some of the rings are cut in section. Fig. 12 shows an edge view of a piece of the mesh, with some of the rings and the formers shown in Figs. 10 and 11 cut in section to illustrate the manner in which the rings go together.

In Figs. 1, 4, 6, and 8, sections are shown of the ring and staple manipulating parts of the automatic machine for forming wire link mesh, which is illustrated, described and claimed in the application of Joseph Merritt and William A. Sawyer, Serial No. 706,394, filed June 28, 1912. The actuating mechanisms for these parts are not shown in this application, for the reason that they are not essential to the practice of the method and form no part of the invention herein claimed. In manufacturing wire link mesh of rings and staples with the machine referred to, the rings 1 are arranged one above another in the vertical channels 2 of a ring magazine 3, and the staples 4 are arranged in horizontal rows side by side on rods 5 in the grooves 6 of a staple magazine 7. In practising this method with such a machine the mechanisms are so arranged that a row of rings is pushed forward from the bottom of the ring magazine by a ring pusher 8 and advanced until they engage a stop 9 above the staples, as shown in Fig. 1. A row of staples is cut off from the staple magazine by a pusher 10 and carried up until their free ends extend through the rings that have been fed from the ring magazine, as shown in Fig. 4. The rings and staples are then in the relations shown in Fig. 5. The staples, and the rings that the free ends of the staples have been passed through, are lowered, as shown in Fig. 6, and another row of rings is pushed forward over the staples so that the rings and staples occupy the relations shown in Fig. 7. The staples with the first-mentioned rings are then raised and the free ends of the staples passed through the second-mentioned row of rings, and after this has taken place, a punch 11 is brought down so as to cause the free ends of the staples to be closed together and form rings which lock both of the previously formed rows of rings together. This method of manipulation is repeated, and a continuous fabric of link-mesh produced. The width of the fabric will of course depend upon the number of rows of rings and staples that are fed from the magazines, and it will be noted that each staple passes through four rings before it is closed—two rings the first time the staple comes up and two rings the second time the staple comes up. Where the process is carried out by such a machine as has been referred to, the mesh is produced very rapidly and accurately. This method can be carried out by simpler apparatus. The closed rings may be arranged in rows in magazine frames, as shown in Fig. 10. These frames may consist of channel bars 12 that are open at one end for receiving the edges of the rings, and that are held together at the other end by plates 13. The closed rings are fed into these magazine frames by any convenient means. A row of opened rings 14 may be engaged with a row of closed rings 15, and then a row of closed rings 16 may be carried over the closed rings 15, and the open rings 14 engaged with these, after which the ends of the opened rings are closed by any suitable mechanism. Of course the row of rings 15 and the row of rings 16 may be first brought over each other as shown in Fig. 10, and then the opened rings engage with them so that each open ring locks together four closed rings in order to form the mesh.

The invention claimed is:

1. The method of forming link-mesh fabric, which consists in feeding a row of closed links onto the ends of a row of opened links, then feeding a succeeding row of closed links onto the ends of the said row of opened links, then closing together the ends of said opened links, then feeding the said succeeding row of closed links onto the ends of a succeeding row of opened links, then feeding a following row of closed links onto the ends of said succeeding row of opened links, then closing together the ends of said succeeding row of opened links, and repeating said steps.

2. The method of forming link-mesh fabric, which consists in feeding in a row the number of closed links necessary to produce the width of the fabric, passing the ends of a row of opened links through and connecting the adjacent closed links, feeding in a row an equal number of closed links, passing the ends of the opened links through the succeeding row of closed links so as to connect together the adjacent links of said succeeding row and join them with the adjacent links of the advance row, then closing the ends of the opened links, and repeating the steps.

3. The method of forming link-mesh, which consists in advancing a row of closed links to a row of opened links, passing the ends of the opened links through the closed links, advancing another row of closed links and passing the ends of the opened links through said following row, and finally closing the ends of the opened links.

4. The method of forming link-mesh, which consists in feeding together a row of closed links and a row of opened links, then feeding together another row of closed links and the first-mentioned row of opened links, and finally closing the opened links so as to join the closed links together.

5. The method of forming link-mesh, which consists in feeding a row of closed links to a row of opened links, feeding the row of opened links until the free ends pass through the closed links, withdrawing the opened links together with the closed links through which they are passed, feeding another row of closed links to the opened links, then feeding the opened links with the first row of closed links until the free ends of the opened links pass through the second row of closed links, and finally closing together the ends of the opened links, whereby each opened link then becomes a closed link and fastens together four of the other links.

ERNEST WALKER SMITH.

Witnesses:
HARRY R. WILLIAMS,
JOSEPHINE M. STREMPFER.